United States Patent
Wentink

(10) Patent No.: US 9,456,470 B2
(45) Date of Patent: Sep. 27, 2016

(54) METHOD AND APPARATUS FOR PROHIBITING DIRECT LINK SETUP IN WIRELESS LOCAL AREA NETWORKS (WLAN)

(75) Inventor: Maarten Menzo Wentink, Naarden (NL)

(73) Assignee: QUALCOMM Incorporated, San Diego, CA (US)

( * ) Notice: Subject to any disclaimer, the term of this patent is extended or adjusted under 35 U.S.C. 154(b) by 648 days.

(21) Appl. No.: 12/968,882

(22) Filed: Dec. 15, 2010

(65) Prior Publication Data

US 2012/0155343 A1 Jun. 21, 2012

(51) Int. Cl.
*H04W 4/00* (2009.01)
*H04W 88/08* (2009.01)
*H04L 29/06* (2006.01)
*H04W 84/18* (2009.01)

(52) U.S. Cl.
CPC .............. *H04W 88/08* (2013.01); *H04L 29/06* (2013.01); *H04W 84/18* (2013.01)

(58) Field of Classification Search
USPC .................................. 370/328, 338, 401, 465
See application file for complete search history.

(56) References Cited

U.S. PATENT DOCUMENTS

| | | | | |
|---|---|---|---|---|
| 5,410,536 | A * | 4/1995 | Shah et al. ................ | 370/216 |
| 7,260,066 | B2 * | 8/2007 | Wang et al. ............... | 370/248 |
| 7,545,771 | B2 * | 6/2009 | Wentink et al. ........... | 370/329 |
| 8,126,493 | B2 * | 2/2012 | Wang ......................... | 455/518 |
| 8,243,623 | B2 * | 8/2012 | Gong et al. ............... | 370/254 |
| 8,259,632 | B2 * | 9/2012 | Seok et al. ................ | 370/311 |
| 2004/0121792 | A1 * | 6/2004 | Allen et al. ............... | 455/519 |
| 2008/0031208 | A1 * | 2/2008 | Abhishek et al. ........ | 370/338 |
| 2008/0219228 | A1 * | 9/2008 | Seok et al. ................ | 370/338 |
| 2009/0232063 | A1 * | 9/2009 | Cordeiro et al. .......... | 370/329 |
| 2011/0007692 | A1 * | 1/2011 | Seok ........................... | 370/328 |
| 2011/0069689 | A1 * | 3/2011 | Grandhi et al. ........... | 370/338 |
| 2011/0110282 | A1 * | 5/2011 | Wu et al. ................... | 370/311 |

(Continued)

OTHER PUBLICATIONS 802 11 Working Group of the 802 Committee: IEEE P802.11n/D11.0 Draft Standard IEEE 802 Part11 : Wireless LAN Medium Access Control (MAC) and Physical Layer (PHY,) specifications. Amendment 5: Enhancements for Higher Throughput, Internet Citation, Jun. 2009, pp. I, 12-98, -2'04, 223-224,379-380,429-430, XP002633076, Retrieved from the Internet: URL: http://ieeexplore.ieee.org/stamp/stamp.jsp"tp=&arnumber=5089380.

(Continued)

*Primary Examiner* — Ricky Ngo
*Assistant Examiner* — Christine Ng
(74) *Attorney, Agent, or Firm* — Kevin T. Cheatham

(57) ABSTRACT

An apparatus and method for prohibiting a direct link setup in a wireless local area network (WLAN), the method comprising receiving a request from a station (STA) for establishing a link with the station (STA); and transmitting a first frame with a Tunneled Direct Link Setup (TDLS) prohibited indication to the station (STA) in response to the request. Another aspect comprises transmitting an association request within a Basic Service Set (BSS) for establishing a link with the station (STA); and receiving a beacon frame with an information element to prohibit the direct link setup of the station (STA). And, another aspect comprises receiving an association request from a station (STA) within the vicinity of an access point for establishing an association between the station (STA) and the access point (AP), and transmitting a Tunneled Direct Link Setup (TDLS) prohibited indication to the station (STA).

48 Claims, 7 Drawing Sheets

(56) References Cited

U.S. PATENT DOCUMENTS

2011/0188429 A1* 8/2011 Seok .............................. 370/311
2012/0151089 A1* 6/2012 Ponmudi et al. ............. 709/237

OTHER PUBLICATIONS 802.11 Working Group: "IEEE P802.11z/D6.0: Draft Standard for Information Technology-Local and metropolitan area networks-Specific requirements-Part 11: Wireless LAN Medium Access Control (MAC) and Physical Layer (PHY) specifications Amendment 6: Extensions to Direct Link Setup (DLS)", IEEE Standard, IEEE, Piscataway, NJ, USA Internet Citation, Aug. 1, 2009, pp. 167, XP002633074, Retrieved from the Internet: URL:http://ieeexplore.ieee.org/stamp/stamp.jsp"tp=&arnumber=5286951 [retrieved on Apr. 14, 2011].

Borges D.R. : "IEEE P802.11 Wireless LANS TGz Meeting Minutes—Atlanta, GA", ITGz Internet Citation, Nov. 16, 2009, 19 ovebber 2009 (Nov. 19, 2009), pp. 1-8, XP002633075, Retrieved from the Internet : URL: https://mentor.ieee.org/802.11/dcn1/09/11-09-1198-00-000z-tgz-atlanta-meeting-min utes .doc.

IEEE: "IEEE Standard for Information Technology-Telecommunications and Information Exchange Between Systems-Local and Metropol it an Area Networks-specific Requirements—Part 11: Wireless LAN Medium Access Control (MAC) and Physical Layer (PHY) Specifications; IEEE Std ; 802.Nov. 2007 (Revision of IEEE Std 802. 1", IEEE Standard ; [IEEE Standard], IEEE , Piscataway, NJ, USA, Jun. 12, 2007, pp. Cover-1 ,-14,18,59-154,386-391,456-461,987-988,997,1059, XP002633077, Retrieved from the Internet:URL:http://ieeexplore.ieee.org/stamp/stamp.jsp"tp=&arnumber=4248378.

International Search Report and Written Opinion—PCT/US2010/060878, International Search Authority—European Patent Office—Apr. 29, 2011.

* cited by examiner

METHOD AND APPARATUS FOR PROHIBITING DIRECT LINK SETUP IN WIRELESS LOCAL AREA NETWORKS (WLAN)

CLAIM OF PRIORITY UNDER 35 U.S.C. §119

The present Application for patent claims priority to Provisional Application No. 61/261,607 entitled "Method and Apparatus for Prohibiting Direct Link Setup in Wireless Local Area Networks (WLAN)" filed Dec. 16, 2009, and assigned to the assignee hereof and hereby expressly incorporated by reference herein.

BACKGROUND

1. Field of Invention

This disclosure relates generally to apparatus and methods for prohibiting a direct link setup in wireless local area network (WLAN) systems. More particularly, the disclosure relates to prohibiting direct link setup in WLAN systems based on the IEEE 802.11 protocol (WiFi).

2. Relevant Background

In many telecommunication systems, communications networks are used to exchange messages among several interacting spatially-separated devices. The various types of networks may be classified in different aspects. In one example, the geographic scope of the network could be over a wide area, a metropolitan area, a local area, or a personal area, and the corresponding networks would be designated as wide area network (WAN), metropolitan area network (MAN), local area network (LAN), or personal area network (PAN). Networks also differ in the switching/routing technique used to interconnect the various network nodes and devices (e.g. circuit switching vs. packet switching), in the type of physical media employed for transmission (e.g. wired vs. wireless), or in the set of communication protocols used (e.g. Internet protocol suite, SONET (Synchronous Optical Networking), Ethernet, etc.).

One important characteristic of communications networks is the choice of wired or wireless media for the transmission of electrical signals among the constituents of the network. In the case of wired networks, tangible physical media such as copper wire, coaxial cable, fiber optic cable, etc. are employed to propagate guided electromagnetic waveforms which carry message traffic over a distance. Wired networks are a static form of communications networks and are typically favored for interconnection of fixed network elements or for bulk data transfer. For example, fiber optic cables are often the preferred transmission media for very high throughput transport applications over long distances between large network hubs, such as, bulk data transport across or between continents over the Earth's surface.

On the other hand, wireless networks are often preferred when the network elements are mobile with dynamic connectivity needs or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks have the distinct advantage of facilitating user mobility and rapid field deployment compared to fixed wired networks. However, usage of wireless propagation requires significant active resource management among the network users and high levels of mutual coordination and cooperation for compatible spectrum utilization.

SUMMARY OF THE INVENTION

Disclosed is an apparatus and method for prohibiting a direct link setup in a wireless local area network (WLAN) system. According to one aspect, a method for prohibiting a direct link setup in a wireless local area network (WLAN), the method comprising receiving a request from a station (STA) for establishing a link with the station (STA); and transmitting a first frame with a Tunneled Direct Link Setup (TDLS) prohibited indication to the station (STA) in response to the request.

According to another aspect, a method for prohibiting a direct link setup in a wireless local area network (WLAN), the method comprising transmitting an association request within a Basic Service Set (BSS) for establishing a link with the station (STA); and receiving a beacon frame with an information element to prohibit the direct link setup of the station (STA).

According to another aspect, a method for prohibiting a direct link setup in a wireless local area network (WLAN), the method comprising receiving an association request from a station (STA) within the vicinity of an access point for establishing an association between the station (STA) and the access point (AP), and transmitting a Tunneled Direct Link Setup (TDLS) prohibited indication to the station (STA).

According to another aspect, a method for prohibiting a direct link setup in a wireless local area network (WLAN), the method comprising receiving an association request from a station (STA) within a Basic Service Set (BSS) for establishing a link with the station (STA); and transmitting an association response frame with a Tunneled Direct Link Setup (TDLS) prohibited indication to the station (STA).

According to another aspect, an apparatus comprising a processor and a memory, the memory containing program code executable by the processor for performing the following: receiving a request from a station (STA) for establishing a link with the station (STA); and transmitting a first frame with a Tunneled Direct Link Setup (TDLS) prohibited indication to the station (STA) in response to the request.

According to another aspect, an apparatus comprising a processor and a memory, the memory containing program code executable by the processor for performing the following: transmitting an association request within a Basic Service Set (BSS) for establishing a link with a station (STA); and receiving a beacon frame with an information element to prohibit the direct link setup of the station (STA).

According to another aspect, an apparatus comprising a processor and a memory, the memory containing program code executable by the processor for performing the following: receiving an association request from a station (STA) within the vicinity of an access point for establishing an association between the station (STA) and the access point (AP), and transmitting a Tunneled Direct Link Setup (TDLS) prohibited indication to the station (STA).

According to another aspect, an apparatus comprising a processor and a memory, the memory containing program code executable by the processor for performing the following: receiving an association request from a station (STA) within a Basic Service Set (BSS) for establishing a link with the station (STA); and transmitting an association response frame with a Tunneled Direct Link Setup (TDLS) prohibited indication to the station (STA).

According to another aspect, an apparatus for prohibiting a direct link setup in a wireless local area network (WLAN), the apparatus comprising means for receiving a request from a station (STA) for establishing a link with the station (STA); and means for transmitting a first frame with a Tunneled Direct Link Setup (TDLS) prohibited indication to the station (STA in response to the request.

According to another aspect, an apparatus for prohibiting a direct link setup in a wireless local area network (WLAN), the apparatus comprising means for transmitting an association request within a Basic Service Set (BSS) for establishing a link with a station (STA); and means for receiving a beacon frame with an information element to prohibit the direct link setup of the station (STA).

According to another aspect, an apparatus for prohibiting a direct link setup in a wireless local area network (WLAN), the apparatus comprising means for receiving an association request from a station (STA) within the vicinity of an access point for establishing an association between the station (STA) and the access point (AP), and means for transmitting a Tunneled Direct Link Setup (TDLS) prohibited indication to the station (STA).

According to another aspect, an apparatus for prohibiting a direct link setup in a wireless local area network (WLAN), the apparatus comprising means for receiving an association request from a station (STA) within a Basic Service Set (BSS) for establishing a link with the station (STA); and means for transmitting an association response frame with a Tunneled Direct Link Setup (TDLS) prohibited indication to the station (STA).

According to another aspect, a computer-readable medium storing a computer program, wherein execution of the computer program is for: receiving a request from a station (STA) for establishing a link with the station (STA); and transmitting a first frame with a Tunneled Direct Link Setup (TDLS) prohibited indication to the station (STA) in response to the request.

According to another aspect, a computer-readable medium storing a computer program, wherein execution of the computer program is for: transmitting an association request within a Basic Service Set (BSS) for establishing a link with a station (STA); and receiving a beacon frame with an information element to prohibit the direct link setup of the station (STA).

According to another aspect, a computer-readable medium storing a computer program, wherein execution of the computer program is for: receiving an association request from a station (STA) within the vicinity of an access point for establishing an association between the station (STA) and the access point (AP), and transmitting a Tunneled Direct Link Setup (TDLS) prohibited indication to the station (STA).

According to another aspect, a computer-readable medium storing a computer program, wherein execution of the computer program is for: receiving an association request from a station (STA) within a Basic Service Set (BSS) for establishing a link with the station (STA); and transmitting an association response frame with a Tunneled Direct Link Setup (TDLS) prohibited indication to the station (STA).

Advantages of the present disclosure may include the capability to prohibit a direct link between wireless stations using low overhead on transmission frames.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
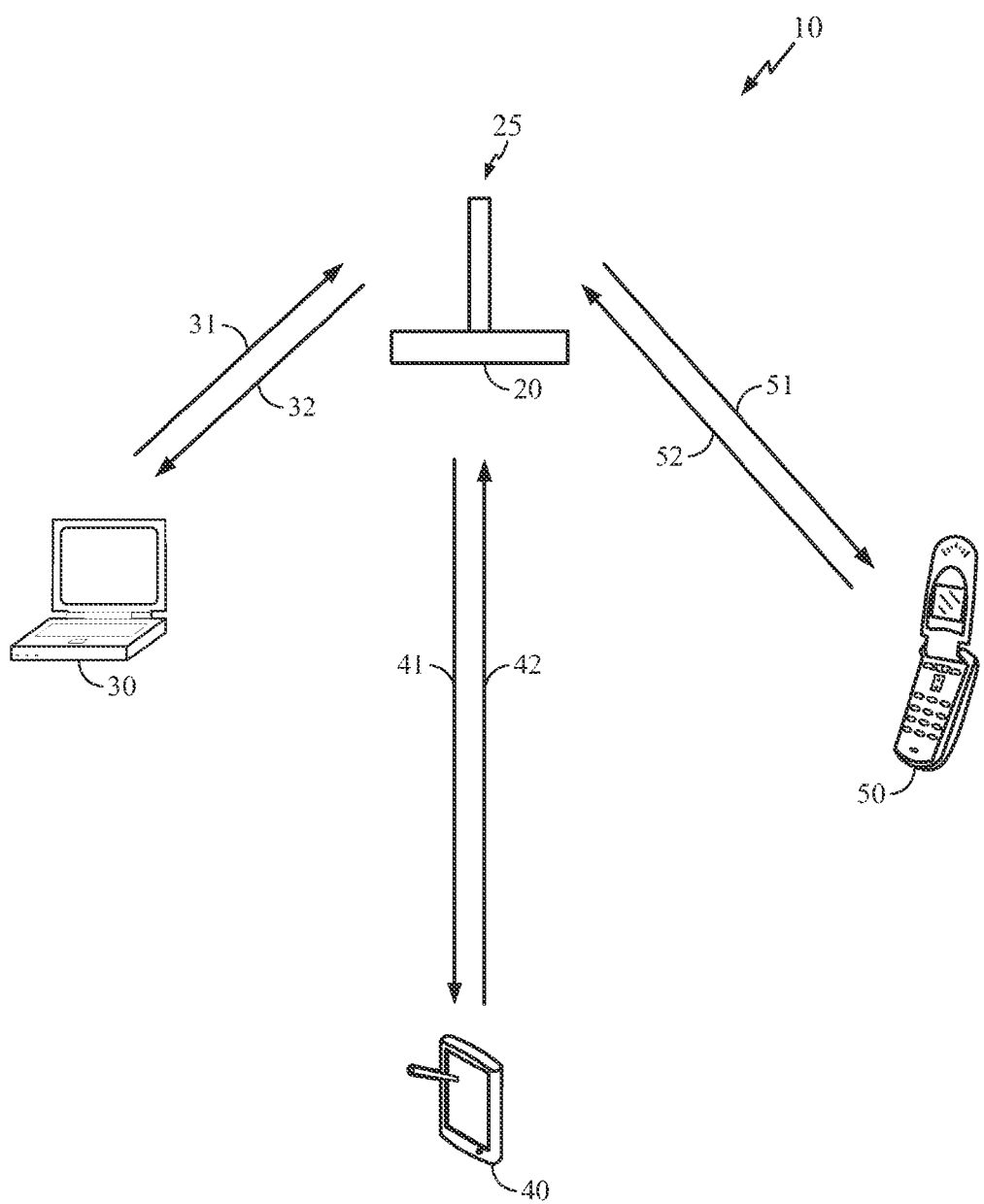
FIG. 1 illustrates an example of a WiFi communication system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art.

In one example, popular wireless network technologies include various types of wireless local area networks (WLANs). A WLAN may be used to interconnect nearby devices together, employing widely used networking protocols such as WiFi or, more generally, a member of the IEEE 802.11 wireless protocol family. In one aspect, a WLAN is comprised of various stations (STAs), which are the components which access the wireless network. For example, there are two types of stations: access points and clients. In general, an access point serves as a hub or base station for the WLAN and a client serves as a user of the WLAN. A client or station (STA) may be a laptop computer, a personal digital assistant (PDA), a mobile phone, etc. In one example, a client (or station (STA)) connects to an access point via a WiFi (i.e., IEEE 802.11 protocol) compliant wireless link to obtain general connectivity to the Internet or to other wide area networks.

In one aspect, 802.11 wireless networks may operate in two modes: infrastructure mode and ad-hoc mode. In infrastructure mode, a client or station (STA) connects to an access point (AP) which serves as a hub to connect wireless clients to the network infrastructure, including, for example, Internet access. Infrastructure mode uses a client-server architecture to provide connectivity to the wireless clients. In ad-hoc mode, wireless clients have direct connections to each other in a peer-to-peer architecture. A Basic Service Set (BSS) is a set of stations (STAs) which interconnect through an AP using wireless connections. If there is no AP, the set of stations is referred to as belonging to an independent BSS (IBSS).

In another aspect, 802.11 wireless networks generate a periodic Beacon signal which broadcasts wireless network characteristics (e.g., maximum data rate, encryption status, AP Media Access Control (MAC) address or Basic Service Set Identifier (BSSID), Service Set Identifier (SSID), etc.) to all nearby clients. For example, the SSID identifies a particular wireless network. In the present disclosure, some of the acronyms used are defined in the Acronym list stated here.

AP Access Point
A1 Address 1
A2 Address 2
A3 Address 3
BSS Basic Service Set
BSSID Basic Service Set Identifier
DTIM Delivery Traffic Indication Map
IE Information Element
IEEE Institute of Electrical and Electronics Engineers
L2 Layer 2
MAC Media Access Control
OUI Organizationally Unique Identifier
P2P Peer-to-Peer
SNAP Subnetwork Access Protocol
SSID Service Set Identifier
STA Station
TDLS Tunneled Direct Link Setup
TSF Timing Synchronization Function
WFA WiFi Alliance
WFD WiFi Display
WiFi Wireless Fidelity An access point 20 (AP) includes an antenna 25 as illustrated in the WiFi communication system 10 of FIG. 1. Stations (STAs) 30, 40, 50 have wireless communication links with the access point 20, wherein the access point 20 transmits information to station 30 over forward link 31 and receives information from station 30 over reverse link 32. Station 40 is in communication with the access point 20, wherein the access point 20 transmits information to station 40 over forward link 41 and receives information from station 40 over reverse link 42. Similarly, station 50 is in communication with the access point 20, wherein the access point 20 transmits information to station 50 over forward link 51 and receives information from station 50 over reverse link 52.

Although the stations (STAs) are represented by three examples of a laptop 30, a PDA 40 and a mobile phone 50, one skilled in the art would understand that other types of stations may be included in the example WiFi communication system without affecting the scope or spirit of the present disclosure. In a frequency division duplex (FDD) system, communication links 31, 32, 41, 42, 51 and 52 may use different frequency bands for communication. For example, forward link 31 may use a different frequency band than that used by reverse link 32.

In one aspect, an access point may be a fixed station used for communicating with the terminals and may also be referred to as an access node, a base station, or some other terminology. A station may also be called an access terminal (AT), a wireless communication device, terminal, user equipment (UE), client or some other terminology.

Figure 2:
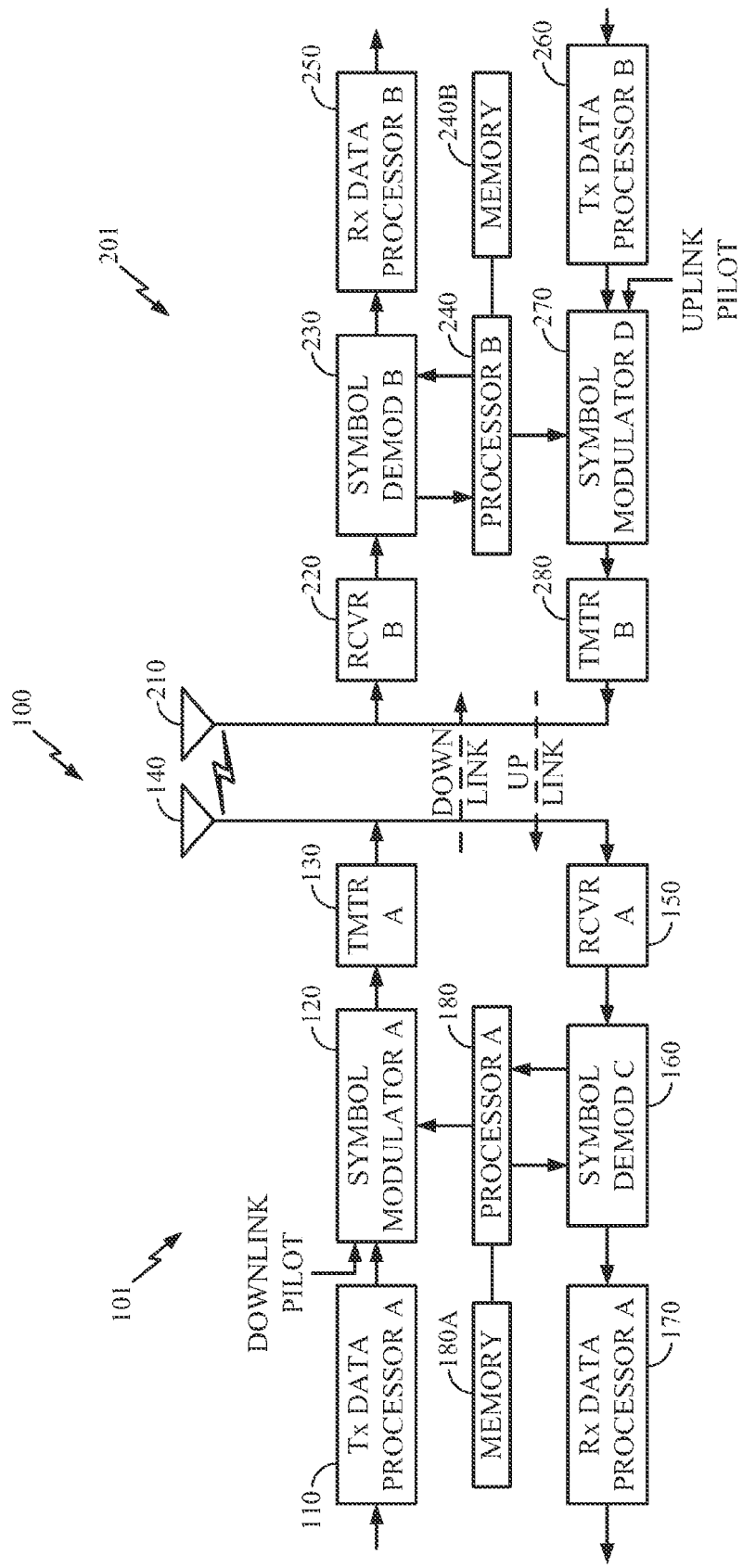
FIG. 2 illustrates an example block diagram of an access point/station (STA) system.

One skilled in the art would understand that the example access point/STA system 100 illustrated in FIG. 2 may be implemented in an Frequency Division Multiple Access (FDMA) environment, an Orthogonal Frequency Division Multiple Access (OFDMA) environment, a Code Division Multiple Access (CDMA) environment, a Wideband Code Division Multiple Access (WCDMA) environment, a Time Division Multiple Access (TDMA) environment, a Space Division Multiple Access (SDMA) environment or any other suitable wireless environment.

The access point/STA system 100 as illustrated in FIG. 2 includes an access point 101 (e.g., base station) and a station or STA 201 (e.g., wireless communication device). In the downlink leg, the access point 101 (e.g., base station) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the STA 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the STA 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from STA 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access point 101 (e.g., base station) and at the STA 201, respectively. In one aspect, either or both processor A 180 and processor B 240 are associated with one or more memory units for storing of program codes and/or data. In one aspect, either or both processor A 180 or processor B 240 or both perform computations to derive frequency and impulse response estimates for the uplink leg and downlink leg, respectively.

Figure 8:
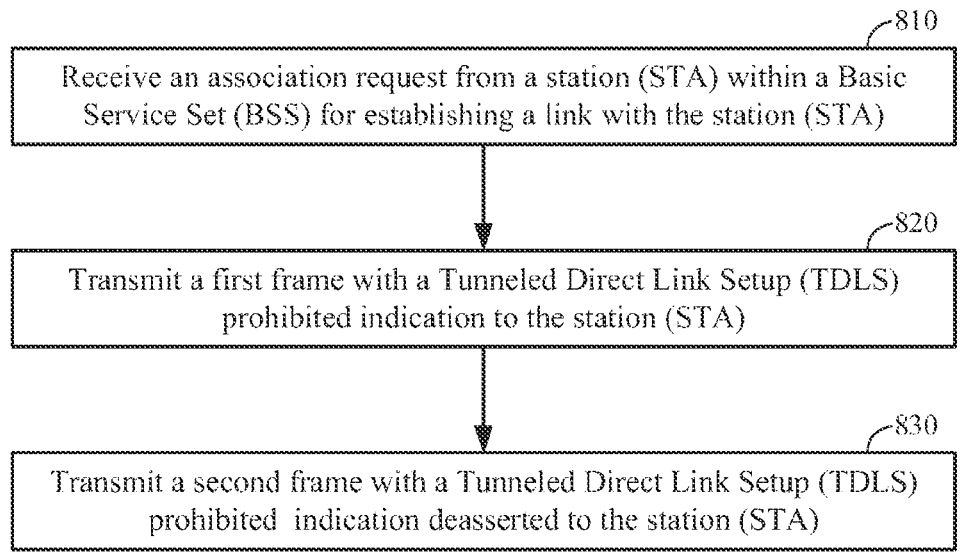
FIG. 8 illustrates a first example flow diagram for prohibiting a direct link setup in a wireless local area network (WLAN).
Figure 9:
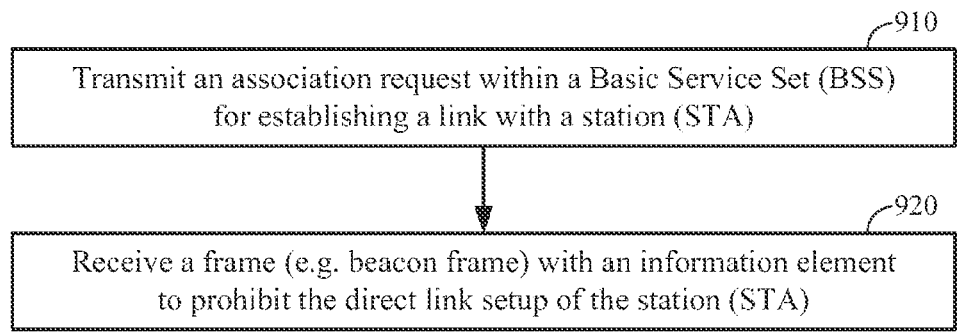
FIG. 9 illustrates a second example flow diagram for prohibiting a direct link setup in a wireless local area network (WLAN).
Figure 10:
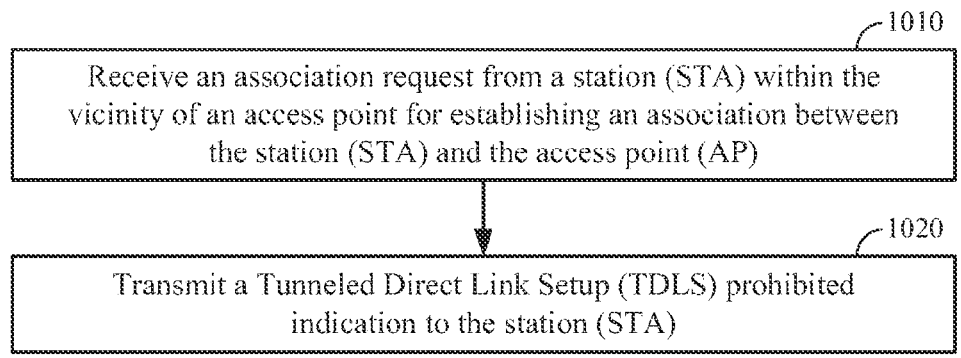
FIG. 10 illustrates a third example flow diagram for prohibiting a direct link setup in a wireless local area network (WLAN).

In one aspect, processor A 180 is in communication with a memory 180A for executing the processes for prohibiting a direct link setup a wireless local area network (WLAN), for example, for implementing one or more of the algorithms illustrated in FIGS. 8, 9 and 10. Similarly, processor B 240 is in communication with a memory 240B for executing the processes for prohibiting a direct link setup a wireless local area network (WLAN), for example, for implementing one or more of the algorithms illustrated in FIGS. 8, 9 and 10. Although the memory 180A and the memory 240B are shown to be separate from processor A 180 and processor B 240 respectively, they could be part of processor A 180 and/or processor B 240, respectively.

In one aspect, the access point/STA system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of STAs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

One skilled in the art would understand that the scope and spirit of the present disclosure are not affected by other examples of radio access technologies employed by other wireless systems, including but not limited to, Universal Mobile Telecommunications System (UMTS), Wideband Code Division Multiple Access (WCDMA), GSM (Global System for Mobile communications: originally from Groupe Special Mobile), GSM/GPRS/EDGE, Long Term Evolution (LTE), Long Term Evolution-Advanced (LTE-A), IS-95, CDMA2000, Evolution-Data Optimized (EVDO) or Ultra Mobile Broadband (UMB), etc.

In one example, the wireless protocol IEEE 802.11z defines a communication protocol which allows wireless 802.11 stations (STAs) that are associated with the same Access Point (AP) to set up a direct link between them. In one aspect, the direct link protocol is referred to as Tunneled Direct Link Setup (TDLS). The TDLS setup messages are encapsulated in a specific Ethertype, so that they can be tunneled through any AP, independent of the AP capability. In one example, the Ethertype is a field within an Ethernet frame which indicates the protocol encapsulated within the frame payload. This feature is useful in particular because APs do not have to be upgraded for TDLS to be used between two STAs which are TDLS capable.

Figure 3:
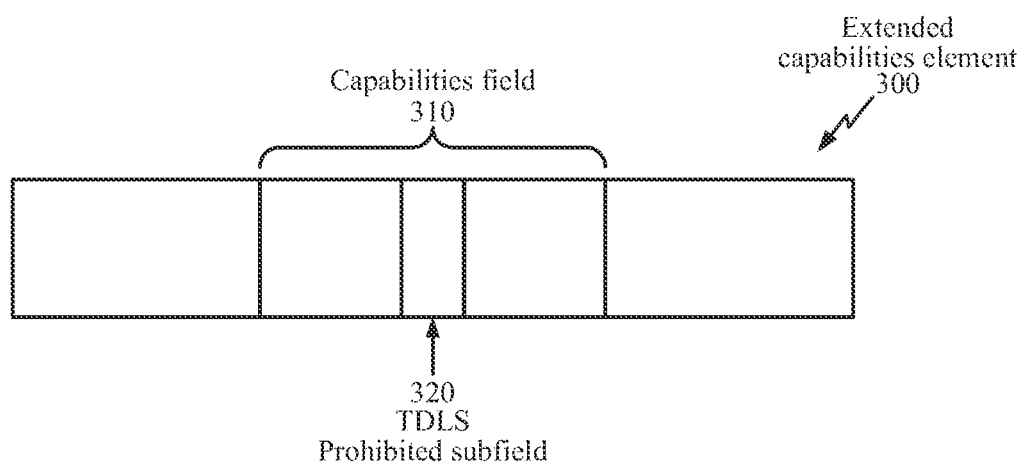
FIG. 3 illustrates an example of a TDLS Prohibited subfield in the Capability field of the Extended Capabilities element.
Figure 4:
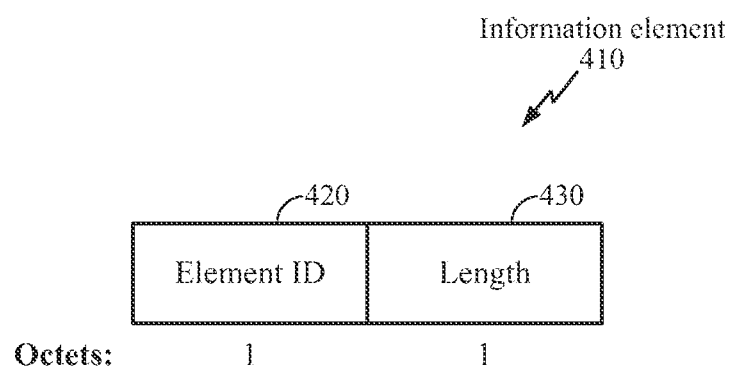
FIG. 4 illustrates an example of a TDLS Prohibited information element format.

In some environments, however, it may be undesirable to set up a direct link. In one example, setting up a direct link using the TDLS protocol may be prohibited in a Basic Service Set (BSS) by including a TDLS Prohibited indication (i.e., TDLS Prohibited indication asserted) inside the beacon frame. In one aspect, a beacon frame is a management frame sent periodically by an AP to convey network information to all users in a wireless network. Example network information includes beacon interval, timestamp, service set identifier (SSID), supported rate, parameter sets, capability information, traffic indicator map (TIM), etc. In one aspect, a Basic Service Set (BSS) comprises an Access Point (AP) and its associated stations (STAs). In another aspect, the TDLS Prohibited indication may be included in a Probe Response frame that is transmitted by the AP to the STA in response to a broadcast Probe Request frame that is transmitted by the STA and that was received by the AP. In yet another aspect, the TDLS Prohibited indication may be included in an Association Response frame that is transmitted by the AP to the STA in response to an Association Request frame that was transmitted by the STA to the AP. Although the examples of the present disclosure describe the TDLS Prohibited indication as explicitly communicated, one skilled in the art would understand that in some situations, the TDLS Prohibited indication may be implicitly communicated. For example, FIG. 3 illustrates an example of a TDLS Prohibited subfield 320 in the Capability field 310 of the Extended Capabilities element 300. In one example the TDLS Prohibited subfield 320 is located in bit 38. The TDLS Prohibited subfield indicates that the use of TDLS is prohibited in this Basic Service Set (BSS). One skilled in the art would understand that another bit may be chosen without affecting the scope and spirit of the present disclosure. FIG. 4 illustrates an example of a TDLS Prohibited information element format.

Figure 5:
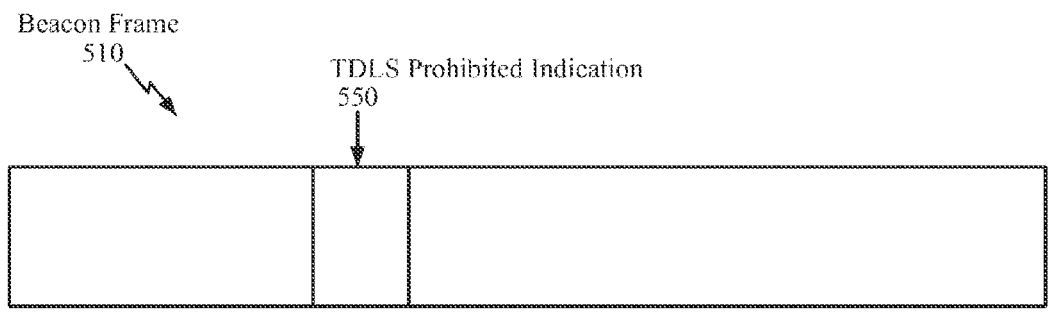
FIG. 5 illustrates an example of a TDLS Prohibited indication within a Beacon frame.
Figure 6:
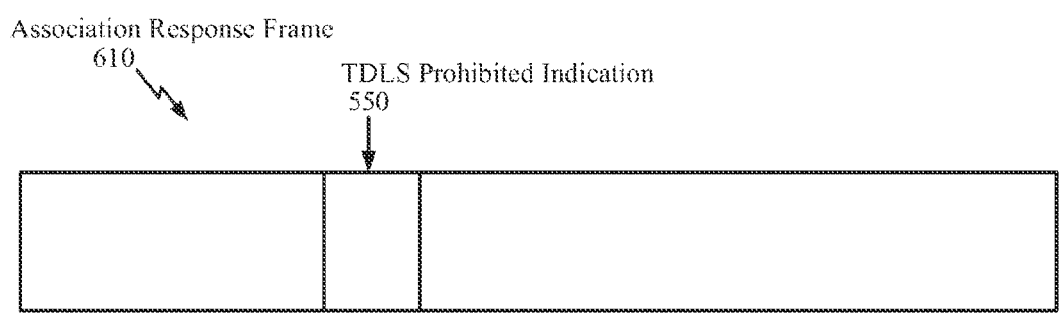
FIG. 6 illustrates an example of a TDLS Prohibited indication within an Association Response frame.
Figure 7:
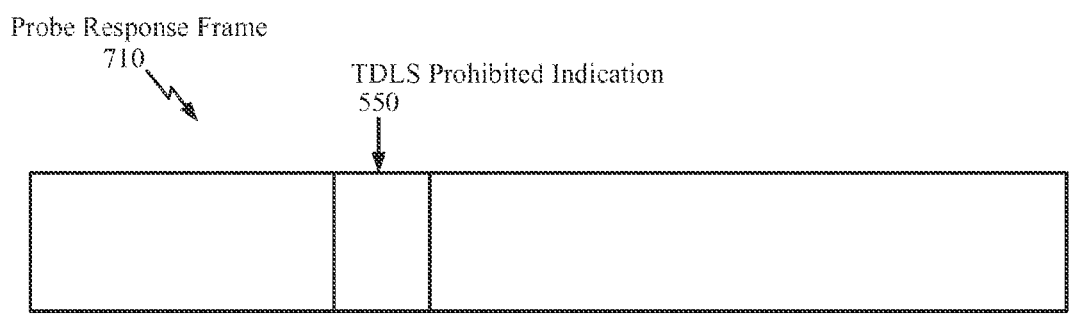
FIG. 7 illustrates an example of a TDLS Prohibited indication within a Probe Response frame.

FIG. 5 illustrates an example of a TDLS Prohibited indication 550 within a Beacon frame 510. FIG. 6 illustrates an example of a TDLS Prohibited indication 550 within an Association Response frame 610. FIG. 7 illustrates an example of a TDLS Prohibited indication 550 within a Probe Response frame 710. One skilled in the art would understand that although the prohibited indication field is shown to be the same in each of the respective frames in FIGS. 5, 6 and 7, the placement of the prohibited indication field may vary within the different frames. In one aspect, the prohibition indication field may be one or more bits and may be distributed across different fields.

In one example, the prohibited indication field may be comprised of one bit while in another example, it may be comprised of more than one bit. In one example, the prohibited indication field may be explicitly assigned. In another example, the prohibited indication field may implicitly use bits originally defined for another purpose. The prohibited indication field may be contained in one field or in more than one field. In one example, the prohibited indication field may be contained within one information element or it may be contained across more than one information element.

One skilled in the art would understand that the explicit examples of the prohibited indication field described above are not exclusive and that other examples may be used without affecting the scope or spirit of the present disclosure. And, that the examples described herein of the prohibited indication field is equally applicable to the examples of FIG. 5, 6 or 7.

In one aspect, when a TDLS capable STA is connected to an AP that includes a TDLS Prohibited indication asserted in its beacon frame or Association Response frame, the STA does not send TDLS messages, and the STA does not respond to received TDLS messages.

In one aspect, the TDLS Prohibited indication (asserted or deasserted) is a capability bit inside the Extended Capability element. In one example, the Extended Capability element is a field within a 802.11 frame which defines certain AP attributes or capabilities. The TDLS Prohibited bit may be bit 38 of the Capability field of the Extended Capabilities element, as illustrated in FIG. 3.

Alternatively, the TDLS Prohibited indication may be an information element that is included in the beacon frame. FIG. 4 illustrates an example of a TDLS Prohibited information element format. The information element 410 comprises an element ID field 420 and a length field 430. In one example, the element ID field 420 consists of 1 octet (i.e., 8 bits). In one example, the length field 430 consists of 1 octet (i.e., 8 bits). In this example, the information element carries no further information, as shown in FIG. 4. The element ID field identifies the TDLS Prohibited information element, as defined in Table 7-26 of the 802.11-2007 protocol. In this example, the length field is set to 0. One skilled in the art would recognize that the TDLS Prohibited information element is also known as the TDLS Prohibited element. In one aspect, adherence by TDLS capable STAs to the TDLS Prohibited indication may be tested during certification tests, such as those performed by the WiFi Alliance (WFA).

In one aspect, the TDLS Prohibited indication may be dynamically inserted in the beacon when direct links are prohibited (i.e., TDLS Prohibited indication asserted) and removed when direct links are allowed (i.e., TDLS Prohibited indication deasserted). For example, the AP transmits a first beacon frame with a TDLS prohibited indication asserted that is received by a TDLS capable STA. Following, the AP transmits a second beacon frame with a TDLS prohibited indication deasserted that is received by the TDLS capable STA to negate the prohibited indication asserted transmitted previously. In one aspect, the transmission of the first beacon frame or second beacon frame is dynamically performed. In another aspect, the TDLS prohibited indication is a bit that is toggled between two states of 1 or 0 for TDLS prohibited indication asserted or TDLS prohibited indication deasserted, respectively.

One skilled in the art would understand that the present disclosure is not confined to the examples of a Beacon frame. In another aspect, the TDLS Prohibited indication may be dynamically inserted in a Probe Response frame or in an Association Response frame, etc. Additionally, one skilled in the art would understand that the present disclosure is not confined to the examples of a Beacon frame, a Probe Response frame or an Association Response frame as others may be used for the TDLS Prohibited indication without affecting the scope and spirit of the present disclosure.

FIG. 8 illustrates a first example flow diagram for prohibiting a direct link setup in a wireless local area network (WLAN). In block 810, receive an association request from a station (STA) within a Basic Service Set (BSS) for establishing a link with the station (STA). In one example, a probe request is received instead of the association request. In one aspect, a link is established between a station (STA) and an access point (AP) when there is a mutual exchange. For example, in accordance with the 802.11 protocol, the STA sends an association request to the AP and the AP, after receiving the association request, in turn replies by sending an association response back to the STA.

Following block 810, in block 820, transmit a first frame with a Tunneled Direct Link Setup (TDLS) prohibited indication to the station (STA). In one aspect, the transmitting is a broadcast transmission. In one example, the first frame is one of the following: a beacon frame, a probe response frame or an association response frame.

In one aspect, the station (STA) associates with an AP that includes a TDLS prohibited indication. In one aspect, the TDLS prohibited indication in an association response frame is transmitted as part of an association procedure. In one aspect, the TDLS prohibited indication may be dynamically inserted in the first frame when at least one direct link is prohibited and removed when the at least one direct link is allowed.

In one aspect, in block 820, the first frame is replaced with an association response frame. Thus, the association response frame with a Tunneled Direct Link Setup (TDLS) prohibited indication is transmitted to the station (STA).

In one example, the TDLS prohibited indication is a TDLS prohibited indication asserted. The TDLS prohibited indication may be a single bit of the association response frame, and the single bit may be part of the capability field of the extended capabilities element of the association response frame. In one example, the single bit is bit 38. In one aspect, a second station (STA) discards a received tunneled direct link setup (TDLS) setup request, and in one aspect, the second station (STA) responds to a received tunneled direct link setup (TDLS) setup response indicating a status code rejecting the request. In one example, the second STA may not be the same as the STA recited in block 820.

Following block 820, in block 830 transmit a second frame with a Tunneled Direct Link Setup (TDLS) prohibited indication deasserted to the station (STA). In one aspect, the transmitting is a broadcast transmission. The step in block 830 may not occur in all situations. In one example, the station (STA) is one of the following: a laptop computer, a personal digital assistant (PDA) or a mobile phone.

In one aspect, a flow diagram for prohibiting a direct link setup in a wireless local area network (WLAN) may comprise of transmitting a first frame with a Tunneled Direct Link Setup (TDLS) prohibited indication to the station (STA). In one example, the flow diagram may further comprise receiving a second frame from the station before transmitting the first frame. Furthermore, the second frame may be either an association request frame or a probe request frame.

FIG. 9 illustrates a second example flow diagram for prohibiting a direct link setup in a wireless local area network (WLAN). In block 910, transmit an association request within a Basic Service Set (BSS) for establishing a link with a station (STA). In block 920, receive a frame with an information element to prohibit direct link setup of the station (STA). In one example, the frame is a beacon frame. In one aspect, the information element comprises an element ID field and a length field, and the element ID field identifies a TDLS Prohibited element, for example, as defined in Table 7-26 of the 802.11-2007 protocol.

FIG. 10 illustrates a third example flow diagram for prohibiting a direct link setup in a wireless local area network (WLAN). In block 1010, receive an association request from a station (STA) within the vicinity of an access point for establishing an association between the station (STA) and the access point (AP). Following block 1010, in block 1020, transmit a Tunneled Direct Link Setup (TDLS) prohibited indication to the station (STA).

One skilled in the art would understand that the steps disclosed in the example flow diagrams in FIGS. 8, 9 and 10 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein.

Figure 11:
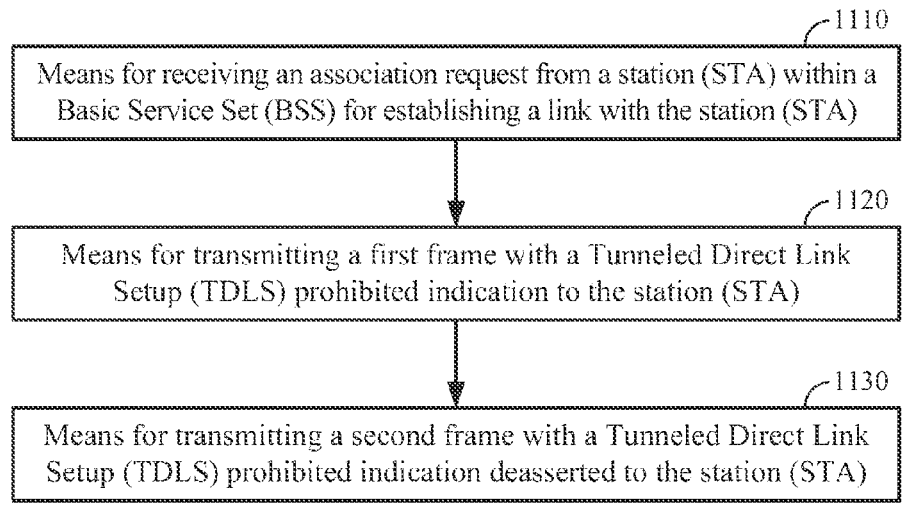
FIG. 11 illustrates a first example of a device suitable for prohibiting a direct link setup a wireless local area network (WLAN).

FIG. 11 illustrates a first example of a device 1100 suitable for prohibiting a direct link setup a wireless local area network (WLAN). In one aspect, the device 1100 is implemented by at least one processor comprising one or more modules configured to provide different aspects of prohibiting a direct link setup a wireless local area network (WLAN) as described herein in blocks 1110, 1120 and 1130. For example, each module comprises hardware, firmware, software, or any combination thereof. In one aspect, the device 1100 is also implemented by at least one memory in communication with the at least one processor.

Figure 12:
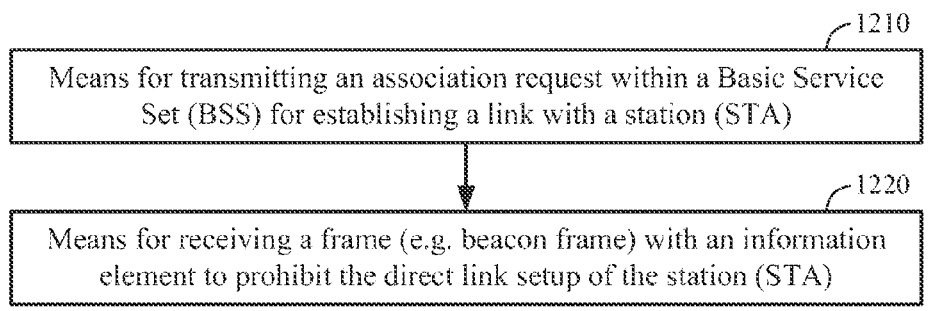
FIG. 12 illustrates a second example of a device suitable for prohibiting a direct link setup a wireless local area network (WLAN).

FIG. 12 illustrates a second example of a device 1200 suitable for prohibiting a direct link setup a wireless local area network (WLAN). In one aspect, the device 1200 is implemented by at least one processor comprising one or more modules configured to provide different aspects of prohibiting a direct link setup a wireless local area network (WLAN) as described herein in blocks 1210 and 1220. For example, each module comprises hardware, firmware, software, or any combination thereof. In one aspect, the device 1200 is also implemented by at least one memory in communication with the at least one processor.

Figure 13:
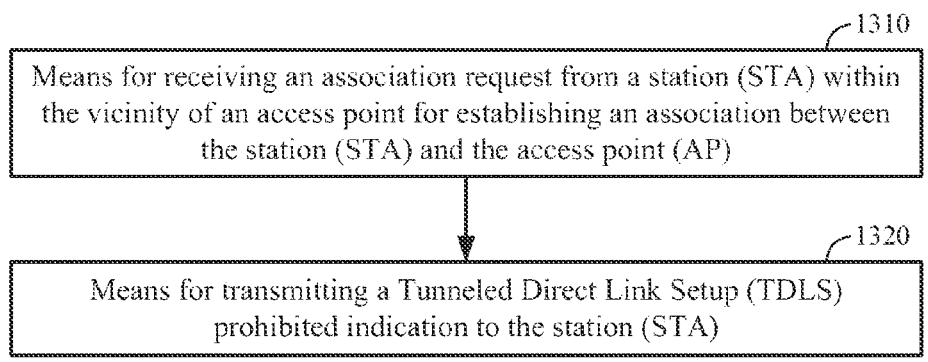
FIG. 13 illustrates a third example of a device suitable for prohibiting a direct link setup a wireless local area network (WLAN).

FIG. 13 illustrates a third example of a device 1300 suitable for prohibiting a direct link setup a wireless local area network (WLAN). In one aspect, the device 1300 is implemented by at least one processor comprising one or more modules configured to provide different aspects of prohibiting a direct link setup a wireless local area network (WLAN) as described herein in blocks 1310 and 1320. For example, each module comprises hardware, firmware, software, or any combination thereof. In one aspect, the device 1300 is also implemented by at least one memory in communication with the at least one processor.

Figure 14:
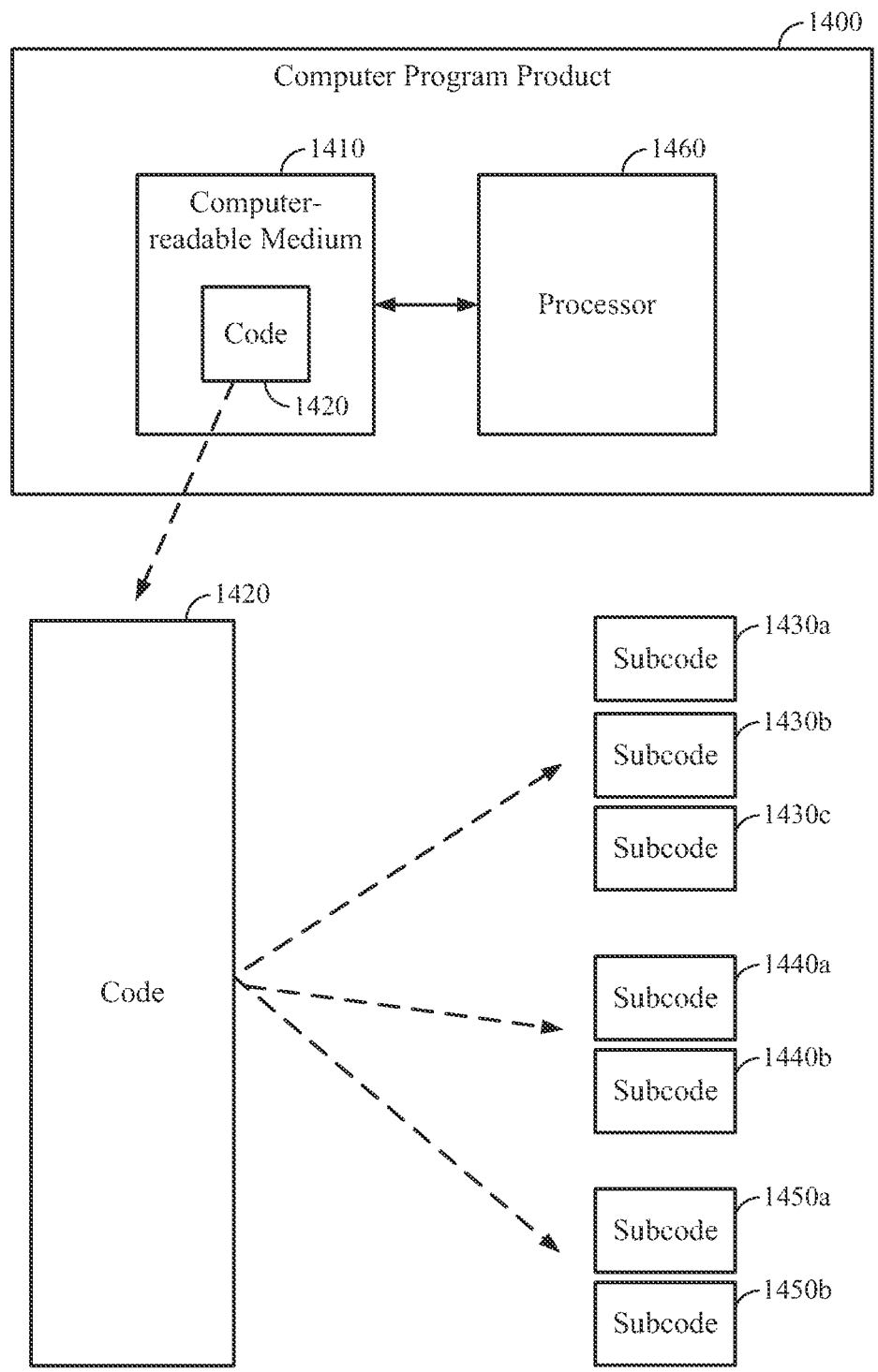
FIG. 14 illustrates an example of a computer program product comprising a computer-readable medium comprising code for performing the algorithms disclosed in FIGS. 8, 9 and 10.

FIG. 14 illustrates an example of a computer program product comprising a computer-readable medium comprising code for performing the algorithms disclosed in FIGS. 8, 9 and 10. FIG. 14 shows a computer program product 1400 comprising a computer-readable medium 1410 and a processor 1460 wherein the processor 1460 can be configured to read the code 1420 stored in the computer-readable medium 1410. In one aspect, the code 1420 comprises of subcodes 1430a, 1430b & 1430c that correspond, respectively, to the steps disclosed in blocks 810, 820 & 830 of FIG. 8. In another aspect, the code 1420 comprises of subcodes 1440a and 1440b that correspond, respectively, to the steps disclosed in blocks 910 & 920 of FIG. 9. And, in yet another aspect, the code 1420 comprises of subcodes 1450a and 1450b that correspond, respectively, to the steps disclosed in blocks 1010 & 1020 of FIG. 10.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method for prohibiting a direct link setup between a first Tunneled Direct Link (TDLS)-capable station (STA) and a second TDLS-capable STA in a wireless local area network (WLAN), comprising:
    receiving, at an access point (AP), an association request from the first TDLS-capable STA to establish a link between the first TDLS-capable STA and the AP; and
    transmitting, from the AP, an association response frame, wherein the link between the first TDLS-capable STA and the AP is established in response to the transmitting of the association response frame, wherein the association response frame includes a Tunneled Direct Link Setup (TDLS) prohibited indication, wherein using the TDLS is prohibited in a basic service set comprising the first TDLS-capable STA and the second TDLS-capable STA, and wherein the TDLS prohibited indication is part of an extended capability element of the association response frame.

2. The method of claim 1, wherein the TDLS prohibited indication is a TDLS prohibited indication asserted.

3. The method of claim 2, further comprising transmitting a second frame with a TDLS prohibited indication deasserted to the first STA.

4. The method of claim 3, wherein the second frame is transmitted by a broadcast transmission.

5. The method of claim 1, wherein the TDLS prohibited indication is a single bit of the association response frame.

6. The method of claim 5, wherein the single bit is part of a capability field of the extended capability element of the association response frame.

7. The method of claim 1, wherein the TDLS prohibited indication is dynamically inserted into the association response frame when at least one direct link is prohibited.

8. The method of claim 1, wherein the first STA is one of the following: a laptop computer, a personal digital assistant (PDA), or a mobile phone.

9. The method of claim 1, wherein the first STA responds to a received TDLS setup response indicating a status code rejecting the request.

10. A method for prohibiting a Tunneled Direct Link Setup (TDLS) between a first TDLS-capable station (STA) and a second TDLS-capable STA in a wireless local area network (WLAN), comprising:
    transmitting, from the first TDLS-capable STA to an access point (AP), an association request within a Basic Service Set (BSS) to establish a link between the first TDLS-capable STA and the AP;
    establishing the link between the first TDLS-capable STA and the AP; and
    receiving, at the first TDLS-capable STA, a beacon frame from the AP, wherein the beacon frame includes an information element to prohibit the TDLS of the first TDLS-capable STA with the second TDLS-capable STA, wherein using the TDLS is prohibited in the BSS comprising the first TDLS-capable STA and the second TDLS-capable STA.

11. The method of claim 10, wherein the information element comprises an element ID field and a length field, and the element ID field identifies a TDLS Prohibited element.

12. A method for prohibiting a direct link setup between a first Tunneled Direct Link (TDLS)-capable station (STA) and a second TDLS-capable STA in a wireless local area network (WLAN), comprising:
    receiving an association request, at an access point (AP), from the first TDLS-capable station (STA) to establish an association between the first TDLS-capable STA and the AP, wherein the AP supports the same communication capabilities as the first TDLS-capable STA, and
    transmitting, from the AP, an association response frame, wherein the association between the first TDLS-capable STA and the AP is established in response to the transmitting of the association response frame, wherein the association response frame includes a Tunneled Direct Link Setup (TDLS) prohibited indication, wherein using the TDLS is prohibited in a basic service set comprising the first TDLS-capable STA and the second TDLS-capable STA, and wherein the TDLS prohibited indication is part of an extended capability element of the association response frame.

13. An apparatus comprising a processor and a memory, wherein the memory includes program code executable by the processor to cause the processor to perform:
    receiving, at an access point (AP), an association request from a first Tunneled Direct Link (TDLS)-capable station (STA) to establish a link between the first TDLS-capable STA and the AP; and
    transmitting, from the AP, an association response frame, wherein the link between the first TDLS-capable STA and the AP is established in response to the transmitting of the association response frame, wherein the association response frame includes a Tunneled Direct Link Setup (TDLS) prohibited indication, wherein using the TDLS is prohibited in a basic service set comprising the first TDLS-capable STA and the second TDLS-capable STA, and wherein the TDLS prohibited indication is part of an extended capability element of the association response frame.

14. The apparatus of claim 13, wherein the TDLS prohibited indication is a TDLS prohibited indication asserted.

15. The apparatus of claim 14, wherein the method further comprises transmitting a second frame with a TDLS prohibited indication deasserted to the first TDLS-capable STA.

16. The apparatus of claim 15, wherein the second frame is transmitted by a broadcast transmission.

17. The apparatus of claim 13, wherein the TDLS prohibited indication is a single bit of the association response frame.

18. The apparatus of claim 17, wherein the single bit is part of a capability field of the extended capability element of the association response frame.

19. The apparatus of claim 13, wherein the TDLS prohibited indication is dynamically inserted into the association response frame when at least one direct link is prohibited.

20. The apparatus of claim 13, wherein the first TDLS-capable STA is one of the following: a laptop computer, a personal digital assistant (PDA), or a mobile phone.

21. The apparatus of claim 13, wherein the first TDLS-capable STA is configured to respond to a received TDLS setup response indicating a status code rejecting the request.

22. An apparatus comprising a processor and a memory, wherein the memory includes program code executable by the processor to cause the processor to perform:
    transmitting, from the first TDLS-capable STA to an access point (AP), an association request within a Basic Service Set (BSS) to establish a link between the first TDLS-capable STA and the AP;
    establishing the link between the first TDLS-capable STA and the AP; and
    receiving, at the first TDLS-capable STA, a beacon frame, from the AP, wherein the beacon frame includes an information element to prohibit a Tunneled Direct Link Setup (TDLS) of the first TDLS-capable STA with the second TDLS-capable STA, wherein using the TDLS is prohibited in the BSS comprising the first TDLS-capable STA and the second TDLS-capable STA.

23. The apparatus of claim 22, wherein the information element comprises an element ID field and a length field, and the element ID field identifies a Tunneled Direct Link Setup (TDLS) Prohibited element.

24. An apparatus comprising a processor and a memory, wherein the memory includes program code executable by the processor to cause the processor to perform:
    receiving an association request, at an access point (AP), from a first Tunneled Direct Link (TDLS)-capable station (STA) to establish an association between the first TDLS-capable STA and the AP, wherein the AP supports the same communication capabilities as the first TDLS-capable STA, and transmitting, from the AP, an association response frame, wherein the association between the first TDLS-capable STA and the AP is established in response to the transmitting of the association response frame, wherein the association response frame includes a Tunneled Direct Link Setup (TDLS) prohibited indication to the first TDLS-capable STA, wherein using the TDLS is prohibited in a basic service set comprising the first TDLS-capable STA and a second TDLS-capable STA, and wherein the TDLS prohibited indication is part of an extended capability element of the association response frame.

25. An access point (AP) for prohibiting a direct link setup between a first Tunneled Direct Link (TDLS)-capable station (STA) and a second TDLS-capable STA in a wireless local area network (WLAN), comprising:

means for receiving, at the AP, an association request from the first TDLS-capable STA for establishing a link between the first TDLS-capable STA and the AP; and means for transmitting, from the AP, an association response frame, wherein the link between the first TDLS-capable STA and the AP is established in response to the transmitting of the association response frame, wherein the association response frame includes a Tunneled Direct Link Setup (TDLS) prohibited indication, wherein using the TDLS is prohibited in a basic service set comprising the first TDLS-capable STA and the second TDLS-capable STA, and wherein the TDLS prohibited indication is part of an extended capability element of the association response frame.

26. The apparatus of claim 25, wherein the TDLS prohibited indication is a TDLS prohibited indication asserted.

27. The apparatus of claim 26, further comprising means for transmitting a second frame with a TDLS prohibited indication deasserted to the first TDLS-capable STA.

28. The apparatus of claim 27, wherein the second frame is transmitted by a broadcast transmission.

29. The apparatus of claim 25, wherein the TDLS prohibited indication is a single bit of the association response frame.

30. The apparatus of claim 29, wherein the single bit is part of a capability field of the extended capability element of the association response frame.

31. The apparatus of claim 25, wherein the TDLS prohibited indication is dynamically inserted into the association response frame when at least one direct link is prohibited.

32. The apparatus of claim 25, wherein the first TDLS-capable STA is one of the following: a laptop computer, a personal digital assistant (PDA) or a mobile phone.

33. The apparatus of claim 25, wherein the first TDLS-capable STA responds to a received TDLS setup response indicating a status code rejecting the request.

34. An apparatus for prohibiting a Tunneled Direct Link Setup (TDLS) between a first TDLS-capable station (STA) and a second TDLS-capable STA in a wireless local area network (WLAN), comprising:

means for transmitting, from the first TDLS-capable STA to an access point (AP), an association request within a Basic Service Set (BSS) to establish a link between the first TDLS-capable STA and the AP;

means for establishing the link between the first TDLS-capable STA and the AP; and means for receiving, at the first TDLS-capable STA, a beacon frame from the AP, wherein the beacon frame includes an information element to prohibit the TDLS of the first TDLS-capable STA with the second TDLS-capable STA, wherein using the TDLS is prohibited in the BSS comprising the first TDLS-capable STA and the second TDLS-capable STA.

35. The apparatus of claim 34, wherein the information element comprises an element ID field and a length field, and the element ID field identifies a TDLS Prohibited element.

36. An apparatus for prohibiting a direct link setup between a first Tunneled Direct Link (TDLS)-capable station (STA) and a second TDLS-capable STA in a wireless local area network (WLAN), comprising:

means for receiving an association request, at an access point (AP), from the first TDLS-capable station (STA) to establish an association between the STA and the access point (AP), wherein the AP supports the same communication capabilities as the first TDLS-capable STA, and means for transmitting, from the AP, an association response frame, wherein the association between the first TDLS-capable STA and the AP is established in response to the transmitting of the association response frame, wherein the association response frame includes a Tunneled Direct Link Setup (TDLS) prohibited indication, wherein using the TDLS is prohibited in a basic service set comprising the first TDLS-capable STA and the second TDLS-capable STA, and wherein the TDLS prohibited indication is part of an extended capability element of the association response frame.

37. A non-transitory computer-readable medium storing a computer program, wherein execution of the computer program by a processor causes the processor to execute:

receiving, at an access point, an association request from a first Tunneled Direct Link (TDLS)-capable station (STA) to establish a link between the first TDLS-capable STA and the AP; and transmitting, from the AP, an association response frame, wherein the link between the first TDLS-capable STA and the AP is established in response to the transmitting of the association response frame, wherein the association response frame includes a Tunneled Direct Link Setup (TDLS) prohibited indication, wherein using the TDLS is prohibited in a basic service set comprising the first TDLS-capable STA and a second TDLS-capable STA, and wherein the TDLS prohibited indication is part of an extended capability element of the association response frame.

38. The non-transitory computer-readable medium of claim 37, wherein the TDLS prohibited indication is a TDLS prohibited indication asserted.

39. The non-transitory computer-readable medium of claim 38, wherein the method further includes transmitting a second frame with a TDLS prohibited indication deasserted to the first TDLS-capable STA.

40. The non-transitory computer-readable medium of claim 39, wherein the second frame is transmitted by a broadcast transmission.

41. The non-transitory computer-readable medium of claim 37, wherein the TDLS prohibited indication is a single bit of the association response frame.

42. The non-transitory computer-readable medium of claim 41, wherein the single bit is part of a capability field of the extended capability element of the association response frame.

43. The non-transitory computer-readable medium of claim 37, wherein the TDLS prohibited indication is dynamically inserted into the association response frame when at least one direct link is prohibited.

44. The non-transitory computer-readable medium of claim 37, wherein the first TDLS-capable STA is one of the following: a laptop computer, a personal digital assistant (PDA), or a mobile phone.

45. The non-transitory computer-readable medium of claim 37, wherein the first TDLS-capable STA responds to a received TDLS setup response indicating a status code rejecting the request.

46. A non-transitory computer-readable medium storing a computer program, wherein execution of the computer program by a processor causes the processor to execute:
- transmitting, from a first TDLS-capable station (STA) to an access point (AP), an association request within a Basic Service Set (BSS) to establish a link between the first TDLS-capable STA and the AP;
- establishing the link between the first TDLS-capable STA and the AP; and
- receiving, at the first TDLS-capable STA, a beacon frame from the AP, wherein the beacon frame includes an information element to prohibit the (TDLS) TDLS of the first TDLS-capable STA with the second TDLS-capable STA, wherein using the TDLS is prohibited in the BSS comprising the first TDLS-capable STA and the second TDLS-capable STA.

47. The non-transitory computer-readable medium of claim 46, wherein the information element comprises an element ID field and a length field, and the element ID field identifies a TDLS Prohibited element.

48. A non-transitory computer-readable medium storing a computer program, wherein execution of the computer program by a processor causes the processor to execute:
- receiving an association request, at an access point (AP), from a first Tunneled Direct Link (TDLS)-capable station (STA) to establish an association between the first TDLS-capable STA and the AP, wherein the AP supports the same communication capabilities as the first TDLS-capable STA, and
- transmitting, from the AP, an association response frame, wherein the association between the first TDLS-capable STA and the AP is established in response to the transmitting of the association response frame, wherein the association response frame includes a Tunneled Direct Link Setup (TDLS) prohibited indication, wherein using the TDLS is prohibited in a basic service set comprising the first TDLS-capable STA and a second TDLS-capable STA, and wherein the TDLS prohibited indication is part of an extended capability element of the association response frame.

* * * * *